United States Patent

[11] 3,560,736

[72] Inventors Adrian C. Billetdeaux
Pittsburgh;
John P. Strange, Murrysville, Pa.
[21] Appl. No. 766,226
[22] Filed Oct. 9, 1968
[45] Patented Feb. 2, 1971
[73] Assignee Mine Safety Appliances Company
Pittsburgh, Pa.
a corporation of Pennsylvania

[54] NON-DISPERSIVE INFRARED GAS ANALYZER WITH UNBALANCED OPERATION
6 Claims, 7 Drawing Figs.

[52] U.S. Cl. .................................................. 250/43.5
[51] Int. Cl. .................................................. G01n 21/26,
G01n 21/34
[50] Field of Search .......................................... 250/43.5

[56] References Cited
UNITED STATES PATENTS
2,555,327  6/1951  Elliott .......................... 250/43.5
2,718,597  9/1955  Heigl et al. ..................... 250/43.5

FOREIGN PATENTS
786,516  11/1957  Great Britain ................ 250/43.5

Primary Examiner—William F. Lindquist
Attorney—Brown, Critchlow, Flick & Feckham ABSTRACT: Separate pulsed sample and reference beams of infrared energy are passed, respectively, through sample and reference gases to separate chambers in a detector unit for measuring the absorption of the sample beam by a component of interest in the sample gas. In the detector unit, the relative absorption of the two beams is measured by a flow responsive sensor in a passage connecting the two chambers, the sensor having a rate of change of resistance that varies inversely with temperature. By substantially unbalancing the two beams, in the absence of a component of interest in the sample gas, so that the sample beam is the stronger before the beams enter the detector unit, the sensitivity of the instrument is greatly increased because of the nonlinear response of the sensor. The greater the initial unbalance, the greater the sensitivity. In the extreme case, the unbalance amounts to complete suppression of the reference beam, so that the analyzer becomes a single beam instrument.

PATENTED FEB 2 1971  3,560,736
SHEET 1 OF 3
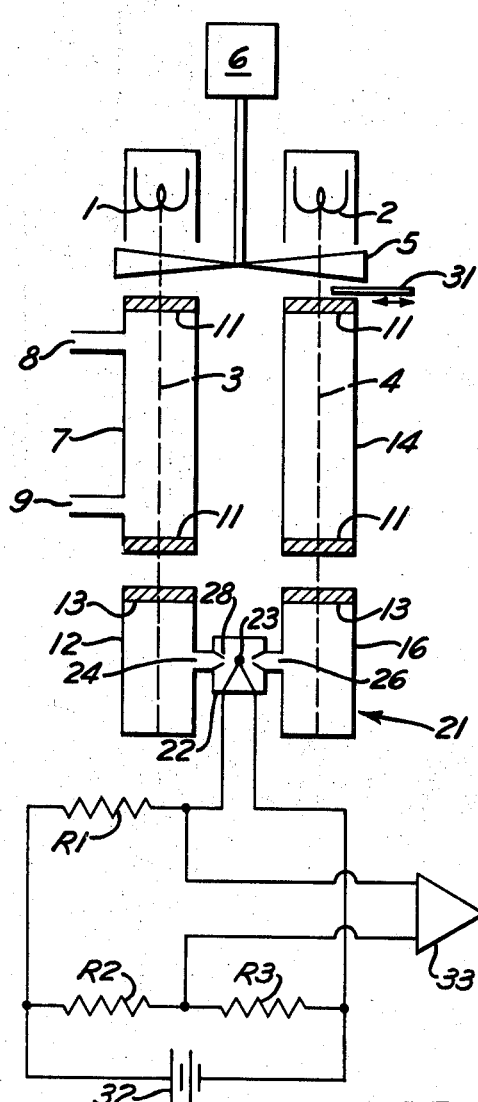
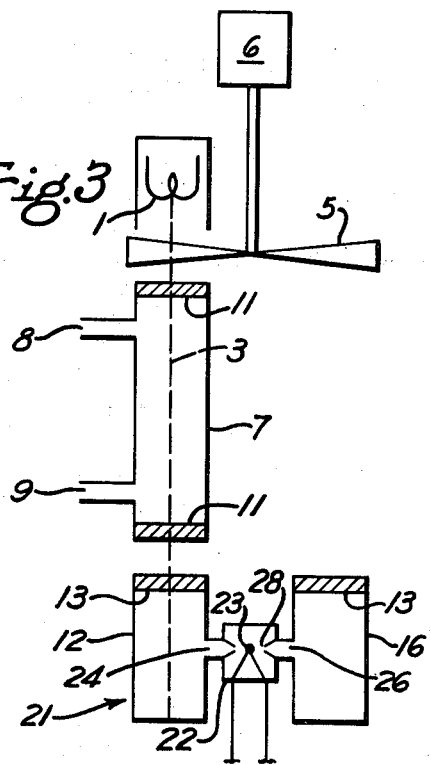
Fig.3
Fig.1
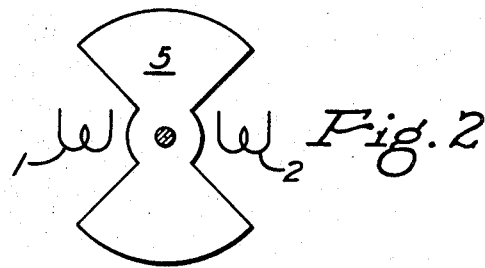
Fig.2
INVENTORS.
ADRIAN C. BILLETDEAUX
JOHN P. STRANGE
BY
Brown, Critchlow, Flick & Peckham
ATTORNEYS.

INVENTORS.
ADRIAN C. BILLETDEAUX
JOHN P. STRANGE
BY Brown, Critchlow, Flick & Peckham
ATTORNEYS.

NON-DISPERSIVE INFRARED GAS ANALYZER WITH UNBALANCED OPERATION

This invention relates to an infrared gas analyzer of the general type in which the gas component of interest is selectively detected by its absorption of a pulsed beam of infrared energy and by the measurement of the resulting attenuation of that beam. It is a primary object of the invention to provide such an analyzer that incorporates a detector unit having an electrically heated resistance sensor responsive to cooling by gas flow and having a rate of change of resistance that varies nonlinearly with temperature, that includes means for substantially unbalancing the infrared energy reaching the detector unit in the absence of the component of interest in a way that will enhance the favorable nonlinear characteristics of such a sensor, and that, in the extreme case, permits the operation of the instrument as a single beam instrument.

Further objects of the invention will be apparent from the following description of a preferred embodiment in connection with the attached drawings, in which:

FIG. 1 represents a diagrammatic view of a nondispersive double beam infrared analyzer with means for attenuating one of those beams to provide unbalanced operation;

FIG. 2 is an end view of the beam chopper shown in FIG. 1;

FIG. 3 is a diagrammatic view of a nondispersive single beam infrared gas analyzer representing the extreme form of unbalanced operation;

Figure 5:
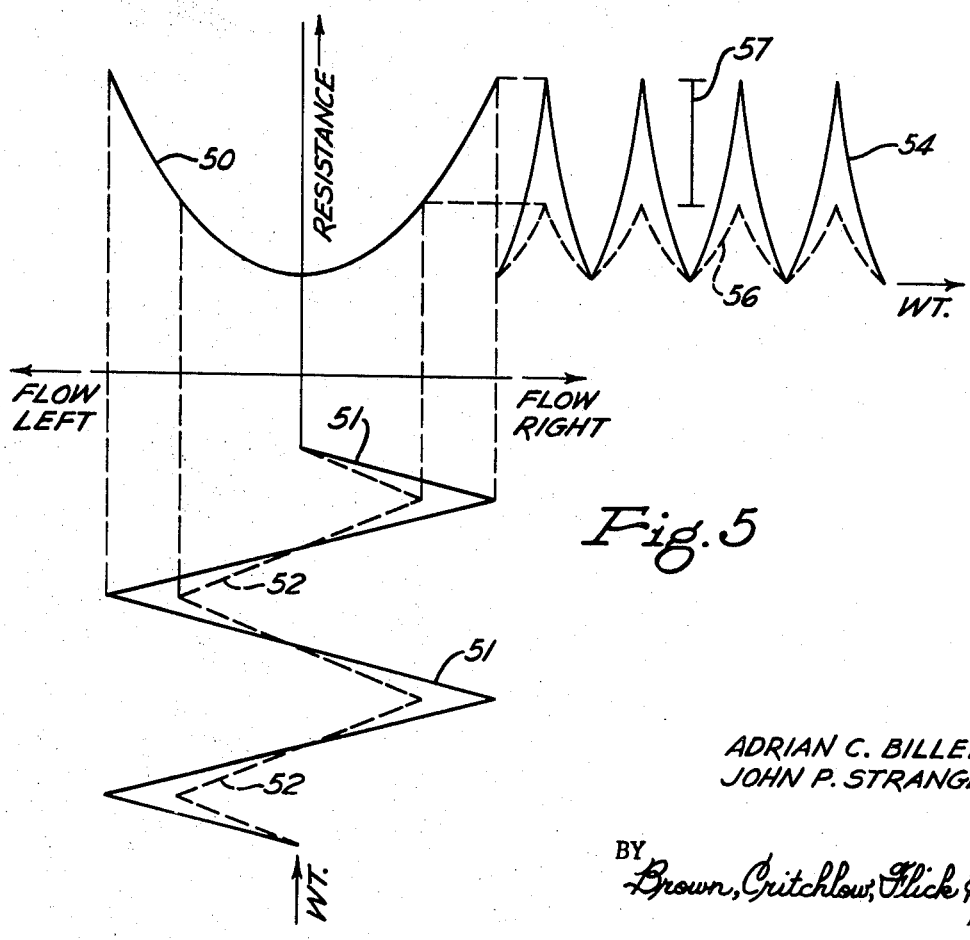
Figure 6:
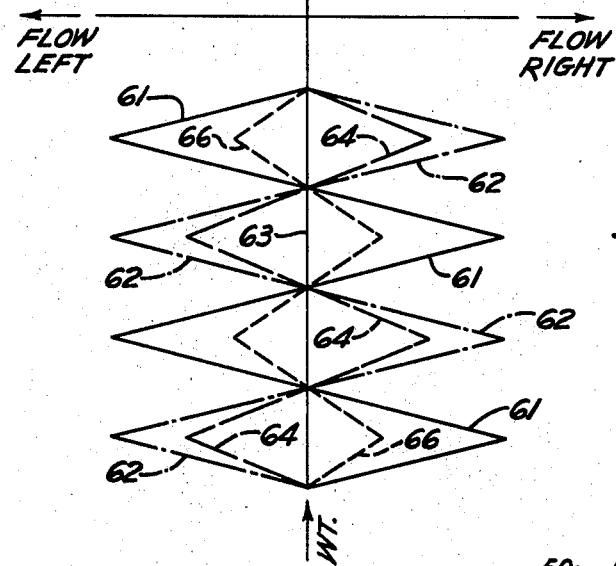
Figure 7:
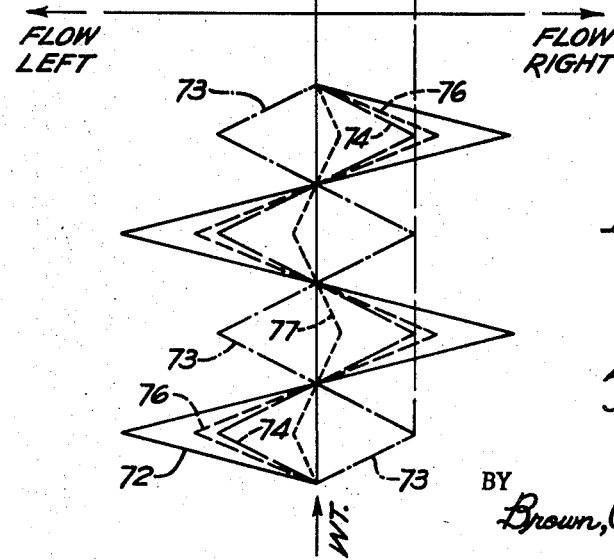

FIG. 5 is a diagram showing the flow transfer characteristic of the sensor in response to gas flow (input signal) produced by pulsed radiation in the presence and in the absence of absorption by a component of interest in the gas to be analyzed and the resulting change in resistance of the sensor (output signal) in the operation of the single beam analyzer of FIG. 3, representing the extreme case of unbalanced operation in which the reference beam is entirely suppressed;

FIG. 6 is a diagram similar to FIG. 5, showing the operation of the analyzer of FIG. 1, with the two beams balanced in the absence of the component of interest; and FIG. 7 is a diagram similar to FIG. 5, showing the operation of the analyzer of FIG. 1, with the two beams unbalanced by 50 percent (i.e., the infrared energy in the sample beam is twice that in the reference beam), in the absence of the component of interest in the gas sample.

In the usual pulsed double beam infrared analyzer, one beam (the sample beam) passes through the gas sample to be analyzed and the other (the reference beam) passes through a reference gas. Each beam then enters a separate gas absorption chamber in a detector unit containing a gas that absorbs infrared energy. In such instruments, the two beams are initially balanced, or substantially so, when they enter the detector unit, i.e., they contain substantially equal amounts of infrared energy. If the sample gas contains a component of interest that absorbs such energy, the sample beam will be attenuated before it reaches the detector unit, and that attenuation can be measured, as for example, by measuring the differential pressure pulses generated in the two chambers. In other words, in conventional operation, the beams are initially balanced and then unbalanced by attenuation of the sample beam in response to the component of interest in the sample. If the attenuation is slight, as it is with low absorptions by the component of interest, the differential pressure pulses between the chambers of the detector unit will be very small and may be offset by other losses in the system or by noise.

The present invention, in contrast, provides for initial unbalance between the sample and reference beams, with the sample beam being substantially the stronger, as both beams enter the detector unit in the absence of the component of interest in the sample gas. This initial unbalance is large enough to maintain an unbalanced condition even at maximum attenuation of the sample beam by absorption by the component of interest. Preferably, this initial unbalance is suppressed or compensated for in the measuring circuit. If the component of interest is present in the sample gas, the sample beam will be attenuated as it reaches the detector unit, but it will still be substantially stronger than the reference beam. The present invention uses such unbalance to take advantage of certain nonlinear response characteristics of a gas flow sensor in a passage between the two gas chambers of the detector unit to increase the sensitivity of the instrument. The greater the unbalance, the greater the increase in sensitivity, the maximum sensitivity occuring when the reference beam is entirely suppressed and the analyzer becomes a single beam analyzer.

The unbalanced operation described above is predicated on taking advantage of certain physical characteristics of a sensor, such as a thermister, that has a nonlinear response to the cooling effect of gas flow over its surface. A thermister is a thermally sensitive electrically resistive element with a negative temperature coefficient of resistance, i.e., its resistance increases with a decrease in its temperature. Further, the rate of change of resistance varies inversely with the temperature, i.e., the resistance increases at a faster rate for each change of unit temperature as the temperature decreases. These characteristics give to the thermister a nonlinear response to gas flow that is highly favorable to the use of such an element as a sensor responsive to a decrease in temperature. If the thermister is heated by an applied external voltage to a temperature above the ambient temperature and if a gas of lower temperature is flowed over the thermister surface, the cooling effect of the gas will produce an increased electrical resistance in the thermister and the rate of change of that resistance will in turn increase the lower the temperature to which the thermister is cooled. If the velocity of the gas flowing over the surface of the thermister is increased, there results a disproportionate increase in output signal or sensitivity, merely because of the change in gas velocity. In other words, if the gas velocity is doubled the increase in response is more than doubled.

Accordingly, the flow responsive detector unit of the present invention is provided with a pair of gas chambers at least one of which is adapted to be irradiated by a pulsed beam of infrared energy and to contain a gas absorbing such energy. A gas flow chamber is connected to each of the gas chambers by a separate passage that terminates at the flow chamber in a jet orifice. These orifices provide high velocity jet flow in the flow chamber in response to the alternate expansion and contraction of the gas in at least one of the gas chambers when subjected to pulsed radiation. In other words, the gas that is irradiated and contains a radiation absorbing component will alternately increase and decrease in temperature, thereby causing the gas to expand and contract and to flow from one gas chamber to the other. A thermister sensor that is responsive to gas flow and has a negative temperature coefficient of resistance over a portion of its temperature range and a rate of change of resistance that varies inversely with temperature is mounted in the flow chamber in the path of the jet flow from the orifices. The response of the sensor can be used to create a fluctuating signal in a conventional electrical measuring circuit.

The foregoing detector unit is the subject matter of the copending application Ser. No. 766,227, filed Oct. 9, 1968 of John P. Strange, one of the inventors herein, and assigned to the same assignee, and filed of even date herewith, for Flow Responsive Detector Unit and Its Applications to Infrared Gas Analyzers.

In FIG. 1, the analyzer is of the double beam nondispersive type that includes a source of infrared radiation, shown here as two substantially identical, side-by-side sources 1 and 2, although it is obvious that they could be combined into a single source and then split, for transmitting radiation along two parallel beam paths. One of those beams, herein called the analytical beam, is composed of rays from source 1 extending parallel to the optical axis 3 (shown in broken lines). The other beam, herein called the reference beam, consists of rays from source 2 and extends parallel to the axis 4. The analytical beam passes from source 1 through a chopper region, where the rays are periodically interrupted by a shutter device 5 rotated by an electric motor 6. The beam then goes through a sample or analytical cell 7, which is provided with a gas inlet 8 and a gas outlet 9 and is otherwise sealed from the atmosphere by infrared-transparent windows 11 at each end. Finally, the analytical beam enters an analytical gas absorption chamber 12 through a window 13 similar to windows 11.

The reference beam follows a path parallel to the analytical beam, passing from source 2 through the chopper region traversed by shutter 5, then through a reference cell 14 similar to the sample cell 7, except that the reference cell contains a fixed volume of reference gas, which is preferably of the same composition as the sample gas but without the particular component that is to be detected and measured. After leaving the reference cell, the reference beam enters a reference gas absorption chamber 16, which is identical with the analytical gas chamber 12 previously described.

The gas chamber 12 and 16 are part of a detector unit 21. Generally, that unit includes a flow chamber 22; a thermister 23 mounted in the flow chamber; flow passages 24 and 26 connecting gas chambers 12 and 16, respectively, to the flow chamber; and jet orifices 28 forming the terminal portions of the passages 24 and 26. In the form of analyzer illustrated in FIG. 1, the detector unit with its constituent chambers and passages may be entirely filled with a mixture of (a) the gaseous component to be detected, or some other infrared absorbing gas, and (b) a nonabsorbing diluent gas.

An adjustable trimmer 31 is provided in the optical path of the reference beam for reducing the energy in that beam before it reaches gas chamber 16 in the detector unit. The trimmer can be inserted more or less into the port of the beam to occlude it by the desired amount. Alternatively, the electrical power to the source 2 can be cut down to decrease the beam energy.

Referring generally to the operation of the analyzer illustrated in FIG. 1, the two beams of infrared energy are transmitted along the analytical and reference paths through the sample and reference cells to the gas chambers of the detector unit. These beams are simultaneously and periodically interrupted by the rotary chopper 5, so that pulses of infrared energy at the chopping frequency pass along the two beam paths. If the pulses reaching the detector unit contain energy in those wave lengths that are absorbed by the gas in that unit, the gas therein will be heated and tend to expand in accordance with the gas laws. If both gas chambers 12 and 16 receive and absorb the same amount of energy the gas expansion in each of those chambers will be equal and there will be an increase in pressure therein and in passages 24 and 26 and in flow chamber 22, but there will be no gas flow through the flow chamber. This condition will prevail, for example, when the two beams have the same energy (under balanced conditions) and when the sample cell 7 contains a sample gas that includes none of the component to be detected and the reference cell 14 contains a similar gas.

In contrast, under unbalanced conditions when the energy in the two beams is unequal, with that in the sample beam being substantially greater than that in the reference beam (as by insertion of the trimmer 31 into the optical path of the reference beam or, in the case of extreme unbalance shown in FIG. 3, where the reference source and reference cell are completely eliminated), there will be greater infrared absorption in gas chamber 12 of the detector unit (which is irradiated by the sample beam) than in gas chamber 16 (which is irradiated by an attenuated reference beam or, as in FIG. 3, by no beam at all). As a result, gas in chamber 12 will expand more than in chamber 16 and create a pulsing flow of gas through the connecting passages and flow chamber 22.

The pulsating gas flow through the flow chamber 22 will cool the thermister, and the cooling effect can be measured as a change in resistance. As shown in FIG. 1, the thermister is one arm of an electrical bridge circuit that also includes fixed resistances R1, R2, and R3 in the other arms. A battery 32 supplies current to the bridge. The pulsed output of the bridge is connected to an AC amplifier 33, which is followed by a rectifier 34, and a smoothing or averaging filter 36 that includes a capacitor 37 and a resistor 38 in parallel. The resulting DC output signal, which is proportional to the AC component of the resistance change of the thermister, is preferably balanced by a bucking circuit 39, so that the zero of the output indicator 41 may be made to correspond with any level of thermister signal within the range of the amplifier system in the absence of the component of interest in the sample gas. The bucking circuit may take the form of a potentiometer 42 and a source of direct current 43 connecting across the indicator 41, as shown in FIG. 1. The indicator 41 may be connected to either polarity, so that an increase or decrease in the magnitude of the thermister AC signal may be considered "upscale."

Figure 4:
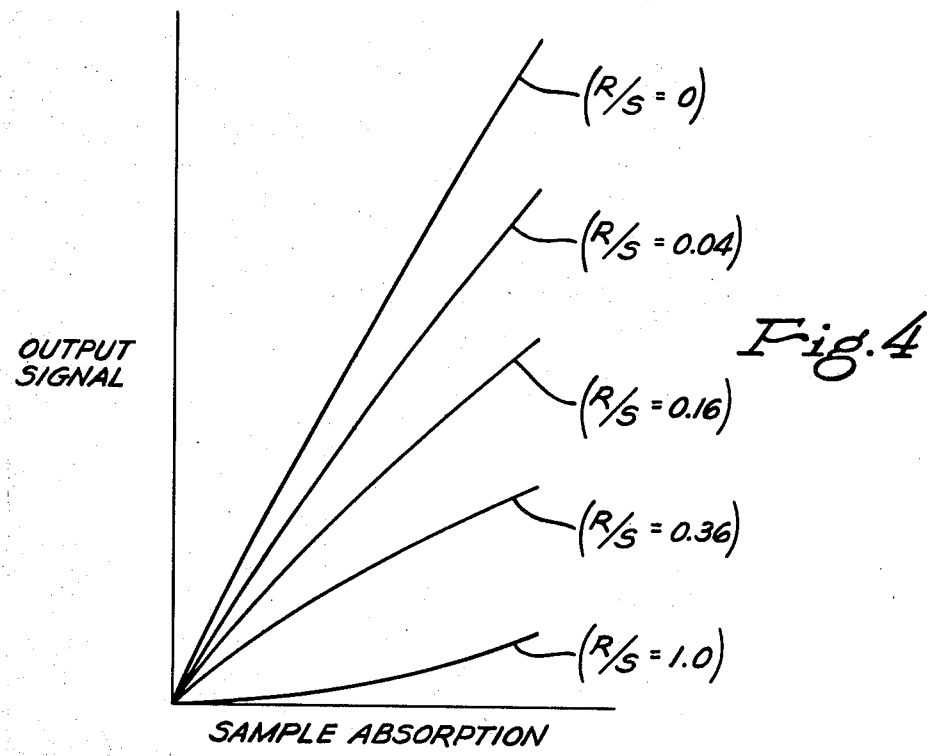
FIG. 4 is a graph showing the relationship between infrared absorption by a component gas of interest and the output signal of the detector unit for balanced operation and for various degrees of unbalanced operation.

To illustrate what happens under the initially unbalanced conditions referred to, there is shown in FIG. 4 a family of analytically derived curves of output signal vs. sample (component of interest) absorption, with the ratio of reference source power to sample source power as a parameter. With a reference to sample source ration of 0, which means that the reference source is deenergized and the instrument is operating "single beam" as in FIG. 3, and with the resulting unbalance output signal "zeroed" in the absence of the component of interest in the sample, the output signal is related to sample absorption as indicated by the top curve of FIG. 4. If the reference source is made equal to the sample source, a reference to sample ratio of 1 (i.e., balanced sample and reference beams), the output signal follows the bottom curve of FIG. 4. In other words, the output signal for any amount of sample absorption is seen to be considerably diminished by "balancing" the beams. Intermediate amounts of unbalance produce output signal vs. sample absorption characteristics intermediate between maximum unbalance (reference/sample = 0) and perfect balance (reference/sample = 1).

FIG. 4 was constructed assuming a parabolic ($y = a + bx^2$) relationship for the nonlinear response characteristics of the sensor 23 (i.e., increasing positive slope with increase in variable). Such a curve is shown in FIGS. 5, 6, and 7. In the upper left portion of these figures, a nonlinear transfer characteristic 50 having symmetry about the ordinate is shown. As applied to the flow responsive sensor of the detector unit described herein, the ordinate represents thermister resistance or, with the appropriate circuit, thermister voltage. The abscissa represents flow between the gas absorption chambers 12 and 16 of the detector unit. When only one of the gas chambers is irradiated (as in FIG. 3), the resulting increase in temperature and pressure produces a flow out of chamber 12 into the second chamber 16, which ceases when the pressure builds up sufficiently in the second chamber. When the radiation is shut off, flow will return from the second chamber to the first chamber as the gas in the first chamber cools. If the radiation into the one chamber of the detector is chopped or pulsed, as by the shutter 5, and sufficient time allowed for temperature equilibrium to be reached, the total flow in one direction will be equal to the total flow in the other direction. Also, if the equilibrium time is long compared with a cycle of the chopper, the flow waveform will be similar to the radiation waveforms; thus the abscissa of the transfer curve also represents beam energy.

The diagrams in FIGS. 5—7 can be most easily understood by reference to FIG. 5, which shows the chopped, single beam operation, and the resulting output signal of the analyzer shown in FIG. 3. In the lower left portion of FIG. 5, a flow or radiation waveform is shown with a net value of zero; i.e., equal right and left values on alternate half cycles of the chopper 5. The solid line 51 represents the flow waveform with no absorption in the sample (i.e., the component of interest is not present). The broken line 52 represents the flow waveform with absorption in the sample due to the presence of the component of interest. In each case, a triangular wave is indicated for convenience. If values are transferred point by point from the abscissa, or flow axis, to the ordinate, or signal axis, using the transfer characteristic of the curve 50, the output signal may be derived. This is shown in the upper right portion of the figure with a solid line 54 representing the "no sample absorption" signal and the broken line 56 representing the signal obtained when the beam energy is diminished by absorption in the sample. The absorption signal is then obviously merely the difference between the solid line and the broken line, shown by the bar 57.

FIG. 6 represents, for comparison, the situation when both detector chambers 12 and 16 are irradiated under balanced operating conditions. Here, the flow waveform 61 resulting from the reference beam is shown as always opposite to the flow waveform 62 from the sample beam, since those beams are pulsed simultaneously by the shutter 5. When the reference and sample beams contain equal infrared energy, i.e., balanced operation with no sample absorption, there will be no net flow through the flow chamber 22, as indicated by the heavy solid line 63. However, when the sample beam is attenuated by sample absorption, the flow induced by the sample beam in chamber 12 will be less, as shown by the line 64. The net flow, a pulsing flow, through the flow chamber 22 will be the algebraic sum of the corresponding abscissae points on lines 61 and 64. This result is shown as line 66 in FIG. 6, representing the net pulsating flow through the chamber 22. Again, transferred point by point, the output signals may be projected as they were in FIG. 5, and the differential output signal (absorption signal) as represented by the bar 67 is shown to be less under balanced conditions (FIG. 5) than under the extreme unbalanced conditions of the single beam instrument (FIG. 5).

In FIG. 7, an intermediate degree of unbalance is shown to produce an intermediate absorption signal represented by the bar 71. Here, the nonattenuated sample beam has a flow waveform represented by the line 72; and the unbalanced, smaller energy of the reference beam is represented by the line 73. Their difference, indicating the net pulsed flow through flow chamber 22 in the absence of the component of interest in the sample (no sample absorption), is shown by the line 74. When the sample contains the component of interest, however, the sample beam is attenuated to the form shown in line 76. The difference between the energy represented by that line and the lesser energy of the reference beam 73 is shown by the line 77. When transferred, the difference between the lines 76 and 73 produce the output signal 71.

Although maximum sensitivity of the instrument is obtained with maximum unbalance of the beams, the use of a reference beam is sometimes desirable to compensate for ambient conditions or in special applications when a relationship by the absorption in the beams other than simple algebraic difference is desired. The unbalanced operation described herein increases the sensitivity of the instrument, particularly for low absorption by the sample gas.

We claim:

1. In an infrared gas analyzer of the type in which the component of interest in a gas sample is selectively detected and measured by its absorption of a pulsed beam of infrared energy emitted by a source of such energy, the improvement comprising: a sample cell adapted to contain the gas sample to be analyzed and to be traversed by a pulsed beam of infrared energy for attenuating said beam to the extent it is absorbed by the component of interest in the gas sample, first and second gas chambers, the first chamber being disposed in the optical path of the beam leaving the sample cell and adapted to contain a gas absorbing infrared energy in the same spectral region as the component of interest for irradiation by said beam, the second chamber being adapted to receive a fixed substantially different amount of infrared energy, including no infrared energy at all, from that received by the first chamber in the absence of the component of interest in the sample cell, a gas flow chamber, a separate passage connecting each gas chamber to the flow chamber and providing relatively high velocity gas flow into the flow chamber as gas flows from one chamber to the other in response to the alternate expansion and contraction of gas in at least one of the gas chambers when subjected to said pulsed energy, an electrically heated resistance sensor responsive to cooling by gas flow and having a rate of change of resistance that varies inversely with temperature, the sensor being mounted in the flow chamber in the path of the high velocity gas flow from the passages to enhance the cooling effect of such gas flow by the entrainment of cool gas in the flow chamber, and an electrical circuit for measuring the change in resistance of the sensor in response to such gas flow in the absence of the component of interest in the sample cell and in the presence of such component therein.

2. Apparatus according to claim 1 that also includes a second pulsed beam of infrared energy and a reference cell adapted to contain a reference gas and to be traversed by the second pulsed beam of infrared energy for attenuating said second beam to the extent that such energy is absorbed by the reference gas, the second gas chamber being disposed in the optical path of the second beam leaving the reference cell and being adapted to contain a gas absorbing infrared energy for irradiation by said beam.

3. Apparatus according to claim 2 that includes means for varying the degree of unbalance between the infrared energies of the first and second beam.

4. Apparatus according to claim 3, in which the means for varying said unbalance include a mechanical trimmer interposed in the path of the second beam.

5. Apparatus according to claim 1, in which the electrical circuit includes means for neutralizing the effects of the changes in resistance of the sensor caused by the unbalance in the pulsed beams in the absence of the component of interest in the sample cell.

6. Apparatus in accordance with claim 1 in which the second gas chamber receives no infrared energy.